April 30, 1957 W. V. SPURLIN 2,790,534
VIBRATORY BOWL FEEDER WITH MONORAIL DISCHARGE
FOR FEEDING BIFURCATED PARTS
Filed Nov. 13, 1953 2 Sheets-Sheet 1

INVENTOR.
WILLIAM V. SPURLIN
BY
HIS ATTORNEY

April 30, 1957 W. V. SPURLIN 2,790,534
VIBRATORY BOWL FEEDER WITH MONORAIL DISCHARGE
FOR FEEDING BIFURCATED PARTS
Filed Nov. 13, 1953 2 Sheets-Sheet 2

INVENTOR.
WILLIAM V. SPURLIN

HIS ATTORNEY

2,790,534

VIBRATORY BOWL FEEDER WITH MONORAIL DISCHARGE FOR FEEDING BIFURCATED PARTS

William V. Spurlin, Indiana, Pa., assignor to Syntron Company, Homer City, Pa., a corporation of Delaware Application November 13, 1953, Serial No. 391,975

6 Claims. (Cl. 198—33)

This invention relates generally to material handling devices such as conveyer feeder bowls and more particularly to an article handling device wherein the articles are fed along a track supported by the bowl and are oriented in a predetermined position for delivery, which position may be other than the manner in which the article is conveyed along the track.

When assembling parts in production or handling parts for similar jobs it is frequently desirable to supply one or more series of articles to a common work station. Each article is fed in turn and oriented to a definite or predetermined position owing to the actual shape of the article. However, the article itself is frequently not adapted for conveying in the manner in which it is desired to be delivered for use in the manufacturing step or assembly program. In such instances it is preferable to employ an article feeding bowl for holding a quantity of articles which are picked up and conveyed along the helical conveyer track in a manner which is most suitable to efficiently convey that particular article, and before the article is to be delivered from the bowl for use it is oriented by a special section track or by projections or abutments arranged to position the articles so they will be readily adaptable for use when delivered from the bowl.

Each of these feeder bowls is mounted on a frame that is supported for vibratory reciprocation as a free body in an inclined path that is arcuate relative to a vertical central axis. These flexible members permit this reciprocatory movement and they may be constructed from elastomer members, metal springs or torsion bars. These flexible members are in turn mounted on a base that is massive relative to the mass of the frame including the loaded bowl. This base is supported on resilient pads or feet as it must vibrate but not as violently as the lighter mass of the frame and bowl that must feed the articles along the track.

The vibrating mass of the frame, bowl and load it carries has to be tuned to reciprocate within a few cycles more or less of the frequency of the driving impulses so that the tuned mass will synchronize with driving impulses. These impulses may be obtained mechanically or electromagnetically. The direction of the force of the impulse may be axial, tangential or along the path of reciprocation. They must be balanced relative to the central axis around which the bowl and frame reciprocate in their inclined arcuate path of movement.

The feeder bowl comprising this invention provides a monorail to receive and deliver the articles in turn from the track to discharge. This monorail is secured to the track in such a position as to receive the properly oriented parts being delivered. These parts are generally of U-shape and the legs thereof straddle the monorail as it is fed from the track onto the monorail. If the parts being fed are symmetrical, they can be oriented by a wiper to travel with the bend or the legs first and the monorail is placed in line with the bifurcation at the track end. In this way the U-shaped parts merely straddle the monorail as they leave the flat track and pass onto the rail. The monorail being formed integral with the bowl and not vibrating within itself continues the movement of the U-shaped parts along the rail to where they are discharged.

If the parts being fed have a projection on one leg which prevents them from conveying along the flat track with the bifurcated plane vertical, they may be oriented to travel along on one side of one leg with the other leg having the projection riding on the top side. When the part is conveyed in this manner, the bifurcated plane being horizontal, the part can be oriented with the legs pointing to the bowl wall and the monorail starts horizontally spaced above the flat track so the legs of the part lying on its side can straddle the monorail and as the part proceeds around the bowl the track drops away and the monorail straightens up to a vertical plane with the parts continuing to be conveyed therealong to the point of discharge. In this way different shaped parts may be properly oriented until the legs of the bifurcated part come astraddle the monorail and the monorail may twist in its progressive extension to turn the bifurcated part in any plane in which it is desired to deliver for use. Thus the monorail may start in a horizontal plane and twist to a vertical plane as it travels around the bowl. It may pick up the bifurcated pieces, turn them vertically, and then invert them for delivery depending upon the requirements.

Other objects and advantages appear hereinafter in the following description and claims.

The accompanying drawings show for the purpose of exemplification without limiting the invention or claims thereto, certain practical embodiments illustrating the principles of the invention wherein:

Figure 1:
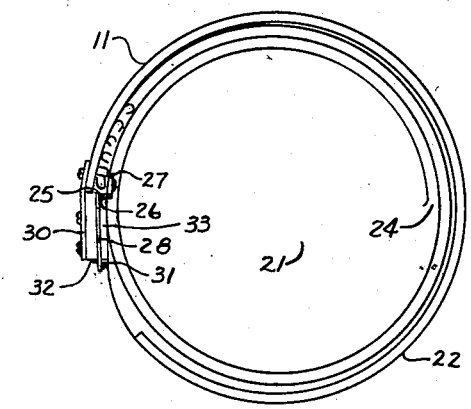
Fig. 1 is a plan view of the feeder bowl having a monorail delivery.

Referring to the drawings, the reciprocating vibratory motor comprises the massive base 1 which is preferably a casting supported by the resilient feet 2 and carries the outer casing 3 that encloses the motor and the control parts therefor.

The base 1 is provided with a plurality of sloping seats 4 uniformly disposed about the vertical central axis indicated by the construction line 5. As shown these seats support the lower ends of the tuned spring means such as the leaf spring means 6. The upper ends of these leaf springs are secured to corresponding seats 7 formed on the frame 8. This frame member is provided with openings to receive the mounting bolts 10 for securing the bowl 11 to the frame.

The motor illustrated is of the electromagnetic type and comprises the core member 12 mounted on the bracket 13 that is adjustably supported on the top of the base 1 by the mounting bolts 14. The core is in the shape of a C and has coils 15. The armature 16 is secured to the underside of the frame 8 and extends over each of the pole faces of the core member 12. By properly mounting the core 12 and the armature 16 relative to the central axis 5 each energy impulse of the motor produces a downward axial pull, causing the springs 6 to flex and move the frame in an inclined arcuate path of movement. When the energy impulse passes, the springs permit the frame to rise to its normal position.

By tuning the springs 6 to reciprocate the frame at a frequency of a few cycles more or less than the frequency of the driving energy impulses, the vibratory system will follow in synchronism with the frequency of the energy impulses and the best operation of this reciprocating vibratory device will be obtained.

If the armature is made of permanent magnet material the frame will reciprocate in synchronism with the energy impulses which would be any suitable source of alternating current. If the armature is made of laminate steel the field would reciprocate at a rate equal to twice the frequency of the alternating current as each cycle has two current impulses. The springs 6 should of course be tuned to within a few cycles of the frequency that the device is to reciprocate. A half wave rectifier such as shown at 17 can be employed to reduce the number of current impulses to that of the frequency which then causes the armature and the parts attached thereto to reciprocate.

The magnitude of the current impulses may be controlled by a simple rheostat as shown at 18. The coil 15, the half wave rectifier 17, and rheostat 18 are connected in series across a source of alternating current.

Figure 2:
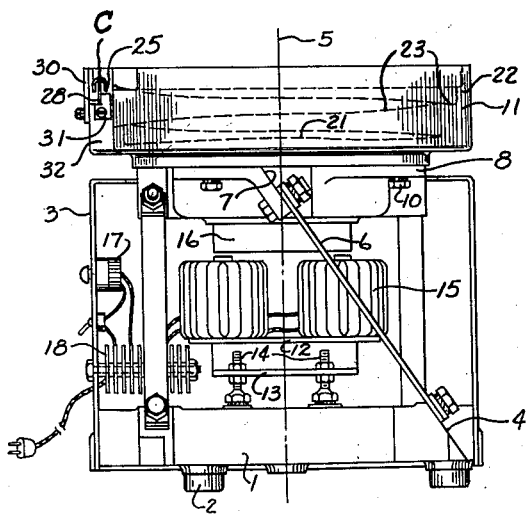
Fig. 2 is a view in side elevation of the structure shown in Fig. 1 and the motor.
Figure 3:
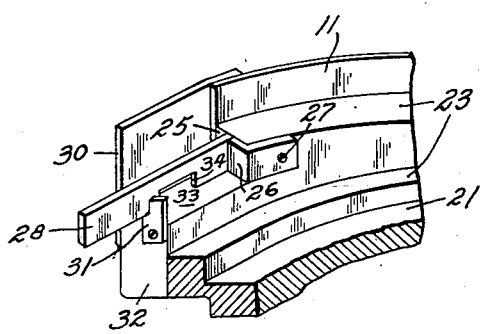
Fig. 3 is a detailed perspective view of the monorail shown in Figs. 1 and 2.

Referring specifically to the feeder bowls of Figs. 1, 2 and 3 the bowl 11 of the cast type has the conical bottom 21 and the annular wall 22 which has on its inner surface the spiral track 23 which starts at 24 and ends abruptly, at 25. The track 23 is flat as shown in Figs. 2 and 3 but it slopes to the wall 22.

The wall 22 as well as the track 23 ends abruptly at 25 to receive the leg 26 of the bracket 27 carrying the monorail 28. An outer wall strap 30 is secured to the outer surface of the bowl and continues its curvature until the point of tangency where it straightens out with the monorail. The outer end of the monorail is supported by the bracket 31 secured to the flat end 32 of the bowl which is spaced from and lower than the end 25 to allow any parts improperly on the monorail to drop to the surface 33 which forms a cutout that allows the parts to fall back into the bowl. The monorail is cut away at 34 to allow the fallen parts to work thereunder and back to the bowl. In conveying a simple U-shaped metal ring shown at C in Fig. 2 they rarely are misaligned on the monorail.

Figure 7:
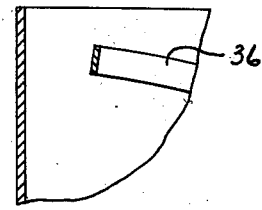
Fig. 7 is a sectional view taken on the line 7—7 of Fig. 4.
Figure 8:
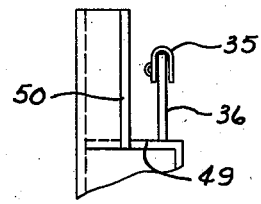
Fig. 8 is a sectional view taken on the line 8—8 of Fig. 4.

In Figs. 4 to 8 inclusive the part 35 is shown on the monorail in Fig. 8 and it has an eye on one leg which is required to be on the right side of the monorail 36. This feeder bowl 37 is fabricated not cast, and has the conical bottom 38 with the annular wall 40 supporting the helical track 41 which at 42 winds upwardly around the innerwall of the bowl to the wiper 43 which is spaced above the track surface sufficiently to allow the U-shaped slide 35 to pass thereunder if the eye is up but if it is turned any other way the zipper slide 35 will be shoved off into the bowl by the vibratory action of progressively feeding the parts forward around the track. Those with the eyes up travel under the wiper 43 and move further around the track until they vibrate against the tapered horizontal section 44 of the monorail. The track is wider as shown at 45. The parts strike against the edge of the monorail 44 and since it is in effect extending out over the track, the parts hit it and if the legs are toward the rail, it passes onto the rails. If it is turned around the part strikes the monorail shown in Fig. 5 and vibrates until the legs pass on both sides of the monorail and ride therealong until the monorail 36 begins to twist and the track 41 falls away leaving the zipper slide conveyed solely along the monorail which twists to the position shown at 46 in Fig. 6. In Fig. 7 the monorail 36 is almost vertical and in Fig. 8 it is vertical.

Figure 4:
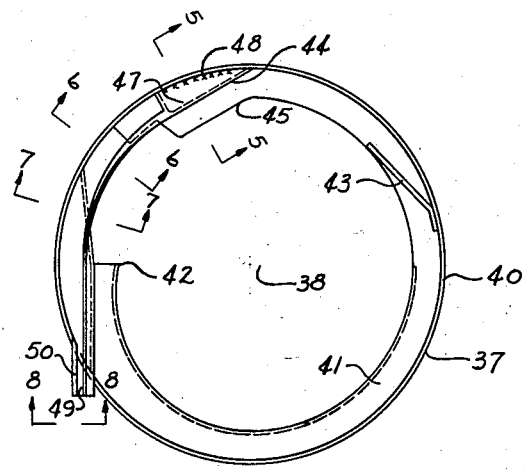
Fig. 4 is a plan view of a feeder bowl having a monorail starting in a horizontal plane.
Figure 5:
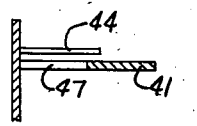
Fig. 5 is a sectional view taken on the line 5—5 of Fig. 4.
Figure 6:
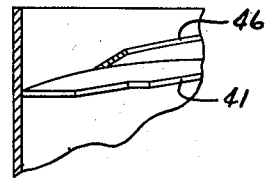
Fig. 6 is a sectional view taken on the line 6—6 of Fig. 4.

As shown in Figs. 4 and 5 the wide track 45 has a cutout 47 which will allow parts not on the monorail to drop down onto the bowl or the track therebelow if any. The end of the track stops abruptly to allow misaligned parts to drop back into the bowl. These abrupt track ends and the cutouts are the means defining cutouts as claimed.

The monorail is secured at one end to the wall 40 as shown at 48 and at its other end to the plate 49 which is also secured to the outwardly projecting wall plate 50.

Vibrations are required to be imparted to these parts to move them along the conveying track and into engagement with the different selecting means and reorientation means to make them function. Mere shoving of the parts along the track without vibration will not properly perform the function. The parts must be actually lifted in their progress to properly operate.

I claim:

1. An article handling feeder bowl for delivering in turn a series of articles which comprises a feeder bowl having a bottom with an upstanding annular wall, motor means to support and effect a vibratory reciprocation of the bowl and each part attached thereto along an arcuate path of movement, an inclined conveyor track means supported by said bowl and extending from the bottom of the bowl upwardly around the inside annular wall to discharge adjacent the rim of said bowl, and monorail means supported by said bowl and fixedly mounted relative to said track to receive astraddle bifurcated parts vibrated in a positive conveying action along the track onto and along the monorail and carry them from the bowl to discharge.

2. The structure of claim 1 characterized in that said track ends abruptly and said monorail extends therefrom in a vertical plane to convey the bifurcated parts to discharge.

3. The structure of claim 1 characterized in that said track and annular wall ends abruptly and said monorail extends from the end of said track and spaced from said annular wall and an outer wall strap secured to said wall and extending along with said track but spaced therefrom.

4. The structure of claim 1 characterized in that said monorail is mounted with its inner end lying in a horizontal plane above said track with one edge on the side facing the interior of the bowl and it continues with the monorail twisting to raise said one edge to the top for carrying the bifurcated articles out of the bowl to discharge.

5. The structure of claim 4 characterized in that the inner end of said monorail is spaced above said track sufficiently to allow one leg of the bifurcated part to be conveyed thereunder by vibration.

6. An article handling feeder bowl for delivering in turn a series of articles which comprises a feeder bowl having a bottom with an upstanding wall, motor means to support and effect a vibratory reciprocation of the bowl and each part attached thereto along an inclined arcuate path of movement, an inclined conveyor track extending from the bottom of said bowl upwardly around the wall and having a surface for feeding articles to discharge, monorail means supported by the bowl and mounted relative to said track to receive astraddle bifurcated parts vibrated in a positive conveying action by their engagement with the track and movement onto and along the monorail to discharge, and means defining cutouts to direct the parts not on the monorail back into the bowl.

References Cited in the file of this patent

UNITED STATES PATENTS

| | | |
|---|---|---|
| 828,396 | Fraser | Aug. 14, 1906 |
| 2,609,914 | Balsiger | Sept. 9, 1952 |